(12) United States Patent
Otsuka (10) Patent No.: US 10,146,062 B2
(45) Date of Patent: Dec. 4, 2018

(54) OPTICAL ELEMENT AND OPTICAL APPARATUS

(71) Applicant: CANON KABUSHIKI KAISHA, Tokyo (JP)

(72) Inventor: Hiroshi Otsuka, Saitama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 189 days.

(21) Appl. No.: 15/314,984

(22) PCT Filed: Oct. 6, 2015

(86) PCT No.: PCT/JP2015/005082
§ 371 (c)(1),
(2) Date: Nov. 30, 2016

(87) PCT Pub. No.: WO2016/059774
PCT Pub. Date: Apr. 21, 2016

(65) Prior Publication Data
US 2017/0199391 A1    Jul. 13, 2017

(30) Foreign Application Priority Data
Oct. 16, 2014  (JP) .................................. 2014-211512

(51) Int. Cl.
*G02B 5/18*  (2006.01)
*G02B 27/28*  (2006.01)
*G02B 5/30*  (2006.01)

(52) U.S. Cl.
CPC ......... *G02B 27/283* (2013.01); *G02B 5/1809* (2013.01); *G02B 5/3058* (2013.01); *G02B 5/3083* (2013.01); *Y10S 977/712* (2013.01)

(58) Field of Classification Search
None
See application file for complete search history.

(56) References Cited

U.S. PATENT DOCUMENTS 7,532,397 B2 * 5/2009 Tanaka ................... B82Y 20/00
                                                          333/219.1
2009/0294755 A1 * 12/2009 Kuekes ................. B82Y 30/00
                                                          257/9

(Continued)

FOREIGN PATENT DOCUMENTS

JP    2008185799 A    8/2008
JP    2009223074 A    10/2009

(Continued)

OTHER PUBLICATIONS

International Search Report issued in Intl. Appln. No. PCT/JP2015/005082, dated Jan. 12, 2016.

(Continued)

*Primary Examiner* — Derek S Chapel
(74) *Attorney, Agent, or Firm* — Rossi, Kimms & McDowell LLP (57) ABSTRACT

The optical element (100) includes a first metal structure layer (2) and a second metal structure layer (4) each including multiple metal structures whose sizes are smaller than an incident wavelength. The optical element further includes a dielectric layer (3) disposed between the first and second metal structure layers. Multiple metal structures 5 (5a to 5h) included in each of the first and second metal structure layers include metal structures having mutually different shapes. A condition of $\lambda(2N+0.5)/(4n) \leq dz \leq \lambda(2N+1.5)/(4n)$ is satisfied where dz represents a distance between the first and second metal structure layers, $\lambda$ represents the incident wavelength, n represents a refractive index of the dielectric layer for the incident wavelength, and N represents an integer equal to or larger than zero.

15 Claims, 6 Drawing Sheets

(56) References Cited

U.S. PATENT DOCUMENTS

| | | | | |
|---|---|---|---|---|
| 2010/0232017 A1* | 9/2010 | McCarthy | ............ | B82Y 20/00 359/485.05 |
| 2012/0075688 A1* | 3/2012 | Yamada | ................ | G02B 5/008 359/241 |
| 2013/0208332 A1 | 8/2013 | Yu et al. | | |
| 2014/0085693 A1* | 3/2014 | Mosallaei | ............ | G02B 1/002 359/107 |

FOREIGN PATENT DOCUMENTS

| | | |
|---|---|---|
| JP | 2012103666 A | 5/2012 |
| JP | 2012189651 A | 10/2012 |
| WO | 2013033591 A1 | 3/2013 |

OTHER PUBLICATIONS

Written Opinion issued in Intl. Appln. No. PCT/JP2015/005082, dated Jan. 12, 2016.

\* cited by examiner

OPTICAL ELEMENT AND OPTICAL APPARATUS

TECHNICAL FIELD

The present invention relates to an optical element including minute metal structures each having a subwavelength size.

BACKGROUND ART

A proposed optical element includes regularly arranged metal structures each having a size smaller than a wavelength of an incident light enter in the optical element (the wavelength is hereinafter referred to as "an incident wavelength") so as to control a phase and a polarization state of the incident light. For example, PLT 1 discloses an optical element that includes regularly arranged metal structures each having a size smaller than an incident wavelength and each having a V shape formed by combining two metal line portions. When an incident wave as a plane wave enters perpendicularly this optical element, the optical element generates, at a certain rate, an extraordinary light that is a polarized light component polarized in a direction different from that of the incident wave. PLT 1 describes that a wavefront of the generated extraordinary light can be controlled by controlling a phase delay amount (that is, by performing a phase control).

Some polarized light component of the incident light entering the optical element disclosed in PLT 1 is transmitted therethrough without being affected by the phase control. In contrast, the extraordinary light generated due to an effect of the metal structures can be changed in its propagating direction and can be condensed, by the phase control. In this manner, the optical element disclosed in PLT 1 provides, by the phase control, the incident light passing through the optical element with different effects depending on a polarization direction. In addition, PLT 1 discloses that an arbitrary phase distribution can be obtained by adjustment of shapes and arrangement of the metal structures.

CITATION LIST

Patent Literature

[PLT1] US Patent 2013/0208332A1

SUMMARY OF INVENTION

Technical Problem

However, the optical element disclosed in PLT 1 has a low generation efficiency of the extraordinary light. This is because the arrangement of the metal structures causes generation of not only a transmitted light but also a reflected light, resulting in a reduced intensity of the transmitted light for generating the extraordinary light. In particular, in an optical element including metal structures, a complex refractive index of a metal as a material of the metal structures significantly affects efficiency of the optical element and an amount of absorption, which is a loss. Moreover, the efficiency is lower in a visible range than in an infrared range due to different complex refractive indices.

The present invention provides an optical element including metal structures and capable of improving a generation efficiency of the extraordinary light.

Solution to Problem

The present invention provides as an aspect thereof an optical element including a first metal structure layer and a second metal structure layer each constituted by multiple metal structures whose sizes are smaller than an incident wavelength as a wavelength of an incident light entering the optical element, and a dielectric layer disposed between the first and second metal structure layers. In each of the first and second metal structure layers, the multiple metal structures include metal structures whose shapes are mutually different, and the following condition is satisfied:

$$\frac{\lambda}{4n}(2N + 0.5) \le dz \le \frac{\lambda}{4n}(2N + 1.5)$$

where dz represents a distance between the first and second metal structure layers, λ represents the incident wavelength, n represents a refractive index of the dielectric layer for the incident wavelength, and N represents an integer equal to or larger than zero.

The present invention provides as another aspect thereof an optical apparatus including the above optical element, and a body holding the optical element.

Further features and aspects of the present invention will become apparent from the following description of exemplary embodiments with reference to the attached drawings.

Advantageous Effects of Invention

The optical element including the metal structures and satisfying the above condition can improve a generation efficiency of an extraordinary light. Thus, use of this optical element enables realizing an optical apparatus having a good optical performance.

DESCRIPTION OF EMBODIMENTS

Exemplary embodiments of the present invention will be described below with reference to the accompanied drawings.

Figure 1:
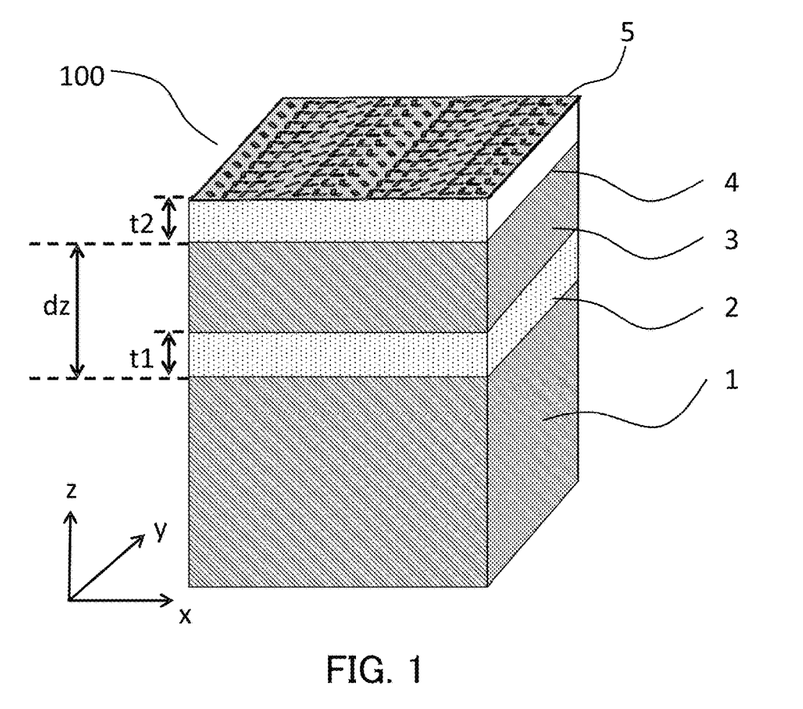
FIG. 1 illustrates a configuration of an optical element that is an embodiment of the present invention.

FIG. 1 schematically illustrates a section of an optical element 100 that is an embodiment of the present invention. The optical element 100 has a structure in which a first metal structure layer 2, a second metal structure layer 4 and a dielectric layer 3 are layered in a z direction. The first metal structure layer 2 is formed on a dielectric substrate 1, the second metal structure layer 4 is disposed separately from the first metal structure layer 2 and the dielectric layer 3 is disposed between the first and second metal structure layers 2 and 4. An incident light enters this optical element 100 from a dielectric substrate side (that is, −z side). In other words, the optical element 100 includes the first metal structure layer 2, the dielectric layer 3 and the second metal structure layer 4 disposed in this order from a side from which the incident light enters. The first and second metal structure layers 2 and 4 each include multiple metal structures 5 whose shapes (configurations) are mutually different and which are arranged regularly at least in one specific direction in a layer plane thereof.

In the following description, the incident light (incident wave) entering the optical element 100 is linearly polarized light, a polarized light component whose polarization direction is the same as that of the incident light is defined as an ordinary light, and a polarized light component whose polarization direction is orthogonal to that of the incident light is defined as an extraordinary light. A wavelength included in the incident light entering the optical element 100 (or entering each metal structure layer) is referred to as "an incident wavelength".

Shapes and an arrangement of the metal structures 5 constituting each of the first and second metal structure layers 2 and 4 are determined depending on a target wavefront shape of the extraordinary light. For example, for a case where a plane wave enters perpendicularly each metal structure layer, the shapes and the arrangement of the metal structures 5 can provide a function of changing a propagation direction of the extraordinary light while maintaining it as the plane wave, a function of condensing the extraordinary light to a point like a lens and a function of having a uniform phase gradient of the extraordinary light like an axicon lens.

In addition, a phase delay amount to be provided to the extraordinary light by each metal structure layer is determined depending on the target wavefront shape. Each metal structure layer can provide a wavefront control to generate an extraordinary light whose wavefront has a desired shape, through the arrangement of the metal structures 5 each having a shape corresponding to this phase delay amount.

As an example, description will be made of a structure of the metal structure layer for changing the propagation direction of the extraordinary light (extraordinary wave). To change the propagation direction of the extraordinary light, metal structures that provide phase delay amounts mutually different by a predetermined amount to the extraordinary light are arranged adjacently in a specific direction in the layer plane of the metal structure layer. Forming the metal structure layer in a structure in which the metal structures are repeatedly arranged at equal intervals allows the amount of difference between the phase delay amounts to be adjusted with number of these repetitions.

For example, when eight metal structures having mutually different shapes are periodically arranged in the metal structure layer, eight metal structures may be employed which provide phase delay amounts mutually different by $\pi/4$ [rad] to the extraordinary light. Since extraordinary lights generated by mutually adjacent metal structures have such phase delay amounts mutually different by $\pi/4$ [rad], an extraordinary light obtained due to overlapping of these extraordinary lights can have its propagation direction changed by an angle $d\theta$. The angle $d\theta$ is obtained by Expression (1) below with an incident wavelength $\lambda$ and a period length P of metal structures that provide an extraordinary light with a phase delay amount of $2\pi$.

$$\sin\theta o = \frac{1}{no}\left(ni\sin\theta i + \frac{\lambda}{P}\right) \qquad (1)$$

$$d\theta = \theta o - \arcsin\left(\frac{ni}{no}\sin\theta i\right)$$

Figure 2:
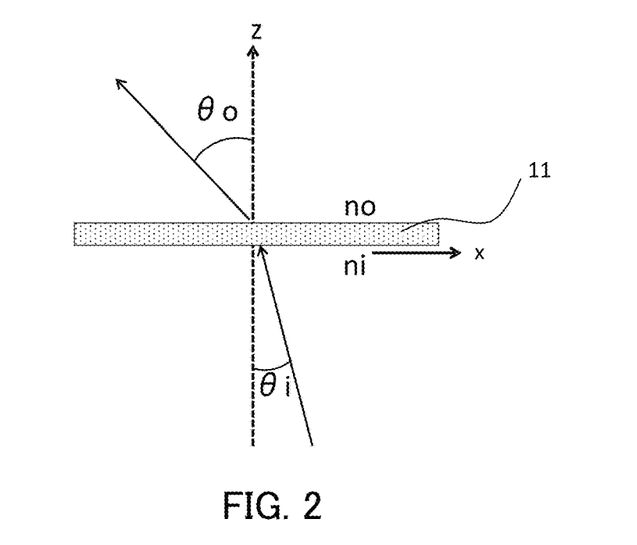
FIG. 2 illustrates an incident angle of an incident light with respect to a metal structure layer in the optical element of the embodiment and an emergent angle of an extraordinary light.

In Expression (1), ni represents a refractive index of a light incident side medium, and no represents a refractive index of a light emergent side medium. Moreover, $\theta i$ represents an incident angle of an incident light to the metal structure layer (metal structures), and $\theta o$ represents an emergent angle of the extraordinary light from the structure layer. FIG. 2 illustrates that the incident light enters a metal structure layer (metal structures) 11 at the incident angle $\theta i$ and the extraordinary light emerges from the metal structure layer 11 at the emergent angle $\theta o$. The incident angle $\theta i$ and the emergent angle $\theta o$ are defined to be positive in a clockwise direction with respect to a z axis in FIG. 2. The phase delay amount of the extraordinary light generated by the metal structures increases in an x direction in FIG. 2. Expression (1) indicates that the propagation direction of the extraordinary light is changed by the angle $d\theta$ depending on the incident wavelength $\lambda$ with respect to the metal structure layer. Expression (1) also indicates that the period length P needs to be larger than the incident wavelength $\lambda$.

Figure 3:
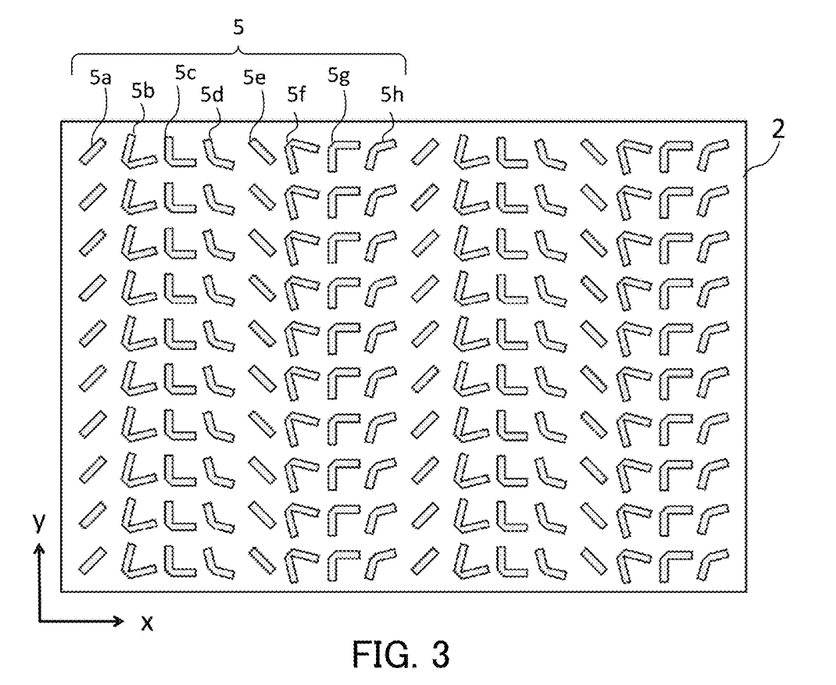
FIG. 3 is an x-y sectional view of the metal structure layer in the optical element of the embodiment.

FIG. 3 illustrates an example of the metal structure layer including, as described above, eight (that is, eight types of) metal structures 5 (5a to 5h); this metal structure layer corresponds to the first metal structure layer 2. The eight metal structures 5a to 5h have mutually different shapes and periodically arranged in the x direction. FIG. 3 illustrates a section of the metal structure layer along an x-y plane. FIG. 3 does not necessarily illustrate the entire metal structure layer, and a region illustrated in FIG. 3 may be part of the metal structure layer.

The shapes and arrangement of the metal structures illustrated in FIG. 3 are an example, and the metal structures may have various shapes and arrangements corresponding to a target wavefront shape. For example, to manufacture an optical element that condenses the extraordinary light to a point like a lens, the metal structure layer should provide a distribution of phase delay amounts that has a phase gradient in a radial direction pointing away from a focal point and no phase gradient in an angle direction (circumferential direction). Such a metal structure layer can be realized by arranging, in the angle direction with no phase gradient, metal structures having the mutually same configurations or providing mutually equivalent phase delay amounts and by arranging, in the radial direction, metal structures providing different phase delay amounts according to the phase gradient. Arranging the above-described metal structures such that the distribution of phase delay amounts to be provided correspond to the phase delay amounts provided by the metal structures can arbitrarily control the shape of the wavefront of the extraordinary light (in other words, can perform the wavefront control).

The metal structure layer is not limited to have the structure in which the metal structures 5 are arranged at equal intervals in x and y directions in the layer plane as illustrated in FIG. 3. The metal structures 5 may have any intervals and any arrangement and do not necessarily need to be periodically arranged. In terms of a generation efficiency of the extraordinary light, it is desirable that mutually adjacent metal structures are densely arranged but not in contact, in other words, the metal structures have shortest intervals as possible.

This embodiment is characterized in that the first and second metal structure layers 2 and 4 satisfy the following condition expressed by Expression (2). Thus, the optical element of this embodiment can reduce an intensity of a reflected component of the ordinary light and improve the generation efficiency of the extraordinary light.

$$\frac{\lambda}{4n}(2N+0.5) \le dz \le \frac{\lambda}{4n}(2N+1.5) \quad (2)$$

In Expression (2), dz represents a distance (hereinafter referred to as "an interlayer distance") in the z direction between the first and second metal structure layers 2 and 4, and λ represents the incident wavelength. Furthermore, n represents a refractive index of the dielectric layer 3 for the incident wavelength λ, and N represents an integer equal to or larger than zero.

The incident wavelength λ is a wavelength at which the optical element 100 of this embodiment is mainly effective. The generation efficiency of the extraordinary light does not need to be higher (that is, highest) at the incident wavelength λ than those at other wavelengths. However, when the optical element is used for a single incident wavelength, it is desirable that the optical element has such a structure that the generation efficiency of the extraordinary light is highest at the incident wavelength. Alternatively, a certain range of wavelengths may be the incident wavelength.

The interlayer distance dz between the first and second metal structure layers 2 and 4 is defined as a distance between bottom surfaces of the first and second metal structure layers 2 and 4 as illustrated in FIG. 1. However, when at least one of the metal structure layers is not located at a uniform position in the z direction, the bottom surface of this metal structure layer is defined as follows. The bottom surface is defined to be a lowest plane in the z direction at which a filling factor of the metal structures in the metal structure layer exceeds PRMAX×0.7 where PRMAX represents a highest filling factor in the x-y plane.

The dielectric layer 3 is formed of a dielectric thin film of at least one type in this embodiment, but may be formed of a stack of multiple types of dielectric layers. The dielectric layer 3 is substantially transparent (that is, has a transmittance equal to or near 100%) for the incident wavelength, and part or whole of the dielectric layer 3 may be formed as a air layer. The dielectric substrate 1 is also formed of a material substantially transparent for the incident wavelength. Since a lower reflectance is desirable at an interface between the dielectric substrate 1 and the dielectric layer 3, these layers are desirably formed of an identical material or materials whose refractive indices close to each other for the incident wavelength.

When the dielectric layer 3 is formed of a multi-layered film of m layers, the term n·dz in Expression (2) is defined by Expression (3) below. In Expression (3), m is an integer equal to or larger than 2.

$$n \cdot dz = \sum_{k=1}^{m} n\_k \cdot dz\_k \quad (3)$$

In Expression (3), n_k represents a refractive index of a k-th layer among the m layers for the incident wavelength λ, and dz_k represents a thickness of the k-th layer in the z direction.

In this embodiment, a medium between the metal structures in the first metal structure layer 2 is the same material as that of the dielectric layer 3, and a medium between the metal structures in the second metal structure layer 4 is air. However, these are merely examples of the media between the metal structures, and the media may be any materials substantially transparent for the incident wavelength.

Figure 5:
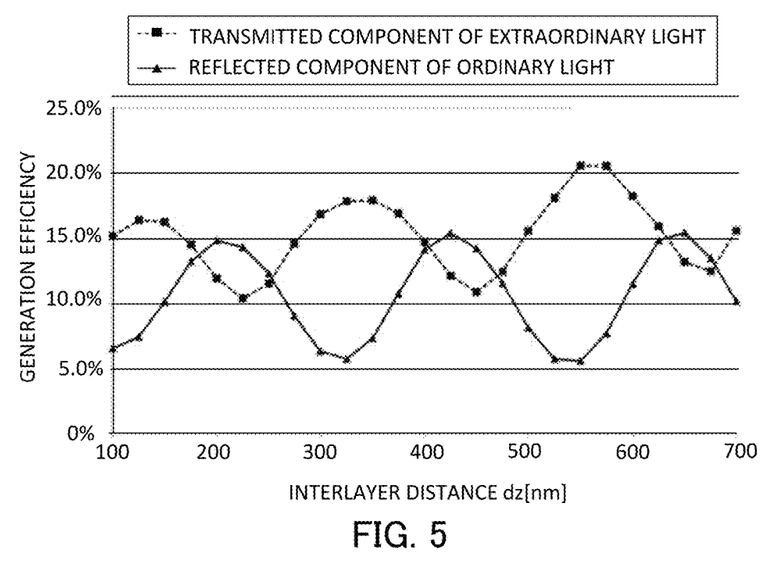
FIG. 5 is a graph showing efficiency against an interlayer distance in an optical element that is Embodiment 1 of the present invention.

Description will be made of an example of such an optical element that the metal structures 5 (5a to 5h) in the first and second metal structure layers 2 and 4 are formed of aluminum and arranged as illustrated in FIG. 3, and the refractive indices of the dielectric layer 3 and the dielectric substrate 1 are 1.5 for an incident wavelength of 650 nm. FIG. 5 illustrates dependency of generation efficiencies of each of the reflected component of the ordinary light and the transmitted component of the extraordinary light with respect to the interlayer distance dz in this optical element. These generation efficiencies were calculated by using an FDTD method. The FDTD method divides the structure of the optical element into minute meshes and calculates time evolutions of an electric field and a magnetic field by solving Maxwell's equations for mutually adjacent meshes. In the following calculation of the generation efficiency, the incident light is a plane wave polarized in the x direction and propagating from the dielectric substrate 1 in the z direction.

In FIG. 5, a horizontal axis represents the interlayer distance dz between the first and second metal structure layers 2 and 4, and a vertical axis represents the generation efficiency. As illustrated in FIG. 5, in the range specified by the condition of Expression (2), the generation efficiency of the reflected component of the ordinary light is suppressed, and the generation efficiency of the transmitted component of the extraordinary light is high.

It is desirable that, in addition to the satisfaction of the condition of Expression (2), at positions located in the first and second metal structure layers 2 and 4 and mutually overlap in a normal direction to the layer planes of the first and second metal structure layers 2 and 4 (that is, in the z direction), a condition of Expression (4) below be further satisfied where Φ represents a difference between the phase delay amounts of the extraordinary lights generated in the first and second metal structure layers 2 and 4. This can further improve the generation efficiency of the transmitted component of the extraordinary light. Hereinafter, the normal direction to the layer planes of the first and second metal structure layers 2 and 4 is referred to as "a layer plane normal direction", and the positions located in the first and second metal structure layers 2 and 4 and mutually overlap in the normal direction are referred to as "normal direction overlap positions".

$$-\frac{\pi}{2} \le \Phi \le \frac{\pi}{2} \quad (4)$$

The difference Φ of the phase delay amounts is defined by Expression (5) below where Φ2 represents the phase delay amount of the extraordinary light provided by the second metal structure layer 4, and Φ1 represents the phase delay amount of the extraordinary light provided by the first metal structure layer 2.

$$\Phi = \Phi 2 - \Phi 1 \quad -\pi < \Phi \leq \pi \tag{5}$$

The difference Φ between the phase delay amounts is defined at the normal direction overlap positions in the first and second metal structure layers 2 and 4 as positions (x,y) at which the metal structures are arranged in both the first and second metal structure layers 2 and 4. When the difference between the phase delay amounts changes in the layer planes of the metal structure layers, the difference Φ between the phase delay amounts is set to an average value of the differences between the phase delay amounts at multiple positions (x,y) as defined above.

In the first and second metal structure layers 2 and 4, metal structures whose shapes are mutually different may be periodically arranged in a specific order in a specific one of directions (in the x direction in this description) in the layer planes of these layers 2 and 4, and the shapes of the metal structures may be of an identical type (for example, a V shape). In this case, the difference between the phase delay amounts is defined by Expression (6) below. In Expression (6), dx represents, when the second metal structure layer 4 is shifted in the x direction relative to the first metal structure layer 2, a minimum amount of the shift at which metal structures formed at the same positions in the x direction have identical shapes in the first and second metal structure layers 2 and 4, and P represents the period length of the metal structures.

$$\Phi = 2\pi \frac{dx}{P} \tag{6}$$

In generation of the extraordinary light, in order to increase the generation efficiency of the transmitted component thereof, such a condition should be met that extraordinary lights generated in the first and second metal structure layers 2 and 4 mutually enhance their intensities when the extraordinary lights overlap with each other. When the incident light enters perpendicularly each of the metal structure layers 2 and 4, the transmitted component of the extraordinary light generated in the first metal structure layer 2 and the transmitted component of the extraordinary light generated in the second metal structure layer 4 have no optical path difference therebetween. Thus, a phase difference between the transmitted components of the extraordinary lights overlapping after passing through the optical element 100 is equivalent to the difference between the phase delay amounts in generation of the extraordinary lights by the metal structures at the normal direction overlap positions in the first and second metal structure layers 2 and 4.

Since a condition for the intensity enhancement of the extraordinary lights corresponds to a case where the phase difference between the extraordinary lights generated in the first and second metal structure layers 2 and 4 is zero, the intensity enhancement occurs when the difference Φ between the phase delay amounts is nearly zero. In contrast, when the difference between the phase delay amounts is near π (or −π), the extraordinary lights generated in the first and second metal structure layers 2 and 4 mutually weaken their intensities. Thus, in order to increase the generation efficiency of the transmitted component, the difference Φ between the phase delay amounts is desirably in a range specified by the condition of Expression (4), in which the intensity enhancement is expected, and the difference Φ between the phase delay amounts is more desirably in a range specified by a condition of Expression (7) below.

$$-\frac{\pi}{4} \leq \Phi \leq \frac{\pi}{4} \tag{7}$$

FIG. 5 illustrates that the generation efficiency of the transmitted component of the extraordinary light is high in a range in which the condition of Expression (2) is satisfied. As described above, arranging the metal structures whose shapes are mutually identical at the normal direction overlap positions in the first and second metal structure layers 2 and 4 makes the difference Φ between the phase delay amounts zero, which causes the intensity enhancement and thereby achieves a high generation efficiency of the transmitted component of the extraordinary light.

The first and second metal structure layers 2 and 4 may be metal structure layers that have mutually different structures but provide the difference Φ (between the phase delay amounts at the normal direction overlap positions) satisfying the condition of Expression (4).

Description will be made of a case where the first and second metal structure layers 2 and 4 have mutually different structures in the optical element 100 having the structure illustrated in FIG. 1. In this case, the first metal structure layer 2 has the structure illustrated in FIG. 3, and the second metal structure layer 4 has a structure illustrated in FIG. 6 that shows a section at the x-y plane similarly to FIG. 3. The metal structures 5 (5a to 5h) included in the first metal structure layer 2 are arranged so that an extraordinary light generated thereby has the same phase as that of an extraordinary light generated by metal structures 5' (5a' to 5h') included in the second metal structure layer 4 at normal direction overlap positions.

Figure 7:
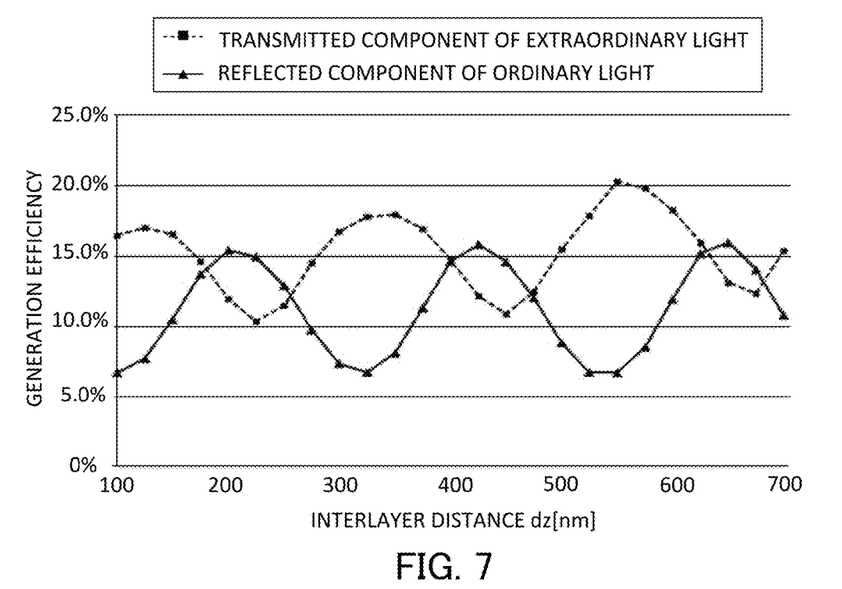
FIG. 7 is a graph showing efficiency against an interlayer distance in an optical element that is Embodiment 2 of the present invention.

FIG. 7 illustrates the generation efficiencies of a reflected component of an ordinary light and a transmitted component of the extraordinary light when the interlayer distance dz between the first and second metal structure layers 2 and 4 is changed in the optical element 100. Since the generation efficiencies illustrated in FIG. 7 have substantially the same characteristics as those in FIG. 5, there is supposed a similar wave phase delay generated by the metal structures included in the first and second metal structure layers 2 and 4.

When the first and second metal structure layers 2 and 4 satisfy the condition of Expression (2), and the difference Φ between the phase delay amounts of the extraordinary lights satisfies a condition of Expression (8) below, the generation efficiency of a reflected component of the extraordinary light can be improved.

$$-\frac{\pi}{2} \leq \Phi - 2\pi \left\{ 2 \frac{n \cdot dz}{\lambda} - N \right\} \leq \frac{\pi}{2} \tag{8}$$

OR $$-\frac{5}{2}\pi \leq \Phi - 2\pi \left\{ 2 \frac{n \cdot dz}{\lambda} - N \right\} \leq -\frac{3}{2}\pi$$

In order to increase the generation efficiency of the reflected component of the extraordinary light, the intensity enhancement of the extraordinary lights generated in the first and second metal structure layers 2 and 4 needs to occur when these extraordinary lights overlap each other. When the incident light enters perpendicularly the metal structure layers 2 and 4, the reflected component of the extraordinary light generated in the first metal structure layer 2 and the reflected component of the extraordinary light generated in the second metal structure layer 4 have an optical path difference of 2n·dz. Thus, the reflected components of the extraordinary lights overlapping after being reflected in the optical element 100 have the following two phase differences. One of the two phase differences originates from the difference between the phase delay amounts in the generation of the extraordinary lights by the metal structures at the normal direction overlap positions in the first and second metal structure layers 2 and 4. The other one of the two phase differences originates from the optical path difference of 2n·dz.

The term of $-2\pi\{2n\cdot dz/\lambda - N\}$ in Expression (8) is a phase difference originating from the optical path difference of 2n·dz. In order to increase the generation efficiency of the reflected component of the extraordinary light, it is desirable that the difference $\Phi$ between the phase delay amounts satisfies a range specified by the condition of Expression (8), in which the intensity enhancement is expected, and it is more desirable that the difference $\Phi$ between the phase delay amounts satisfies a condition of Expression (9) below.

$$-\frac{\pi}{2} \leq \Phi - 2\pi\left\{2\frac{n\cdot dz}{\lambda} - N\right\} \leq \frac{\pi}{2} \qquad (9)$$

OR $$-\frac{9}{4}\pi \leq \Phi - 2\pi\left\{2\frac{n\cdot dz}{\lambda} - N\right\} \leq -\frac{5}{2}\pi$$

Figure 8:
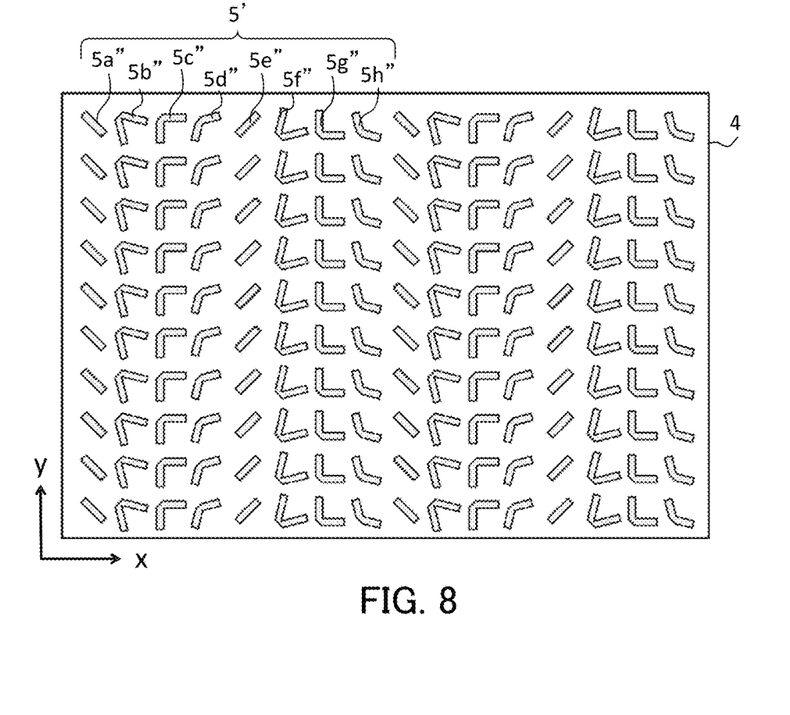
FIG. 8 is an x-y sectional view of a metal structure layer in Embodiment 2.

Description will be made of a case where, at corresponding positions in the layer planes of the first and second metal structure layers 2 and 4, the metal structures in the second metal structure layer 4 have shapes corresponding to those of the metal structures in the first metal structure layer 2 which are rotated in the x-y plane by 90° about an axis parallel to the z direction. Specifically, in this case, the first metal structure layer 2 has the structure illustrated in FIG. 3, and the second metal structure layer 4 has a structure including metal structures 5" (5a" to 5h") as illustrated in FIG. 8 showing a section at the x-y plane similarly to FIG. 3. For example, the metal structures 5a and 5a" at the corresponding positions in the layer planes of the first and second metal structure layers 2 and 4 each have a shape obtained through rotation of the other by 90° in the x-y plane. Since dx=P/2, the difference $\Phi$ between the phase delay amounts is π.

Figure 9:
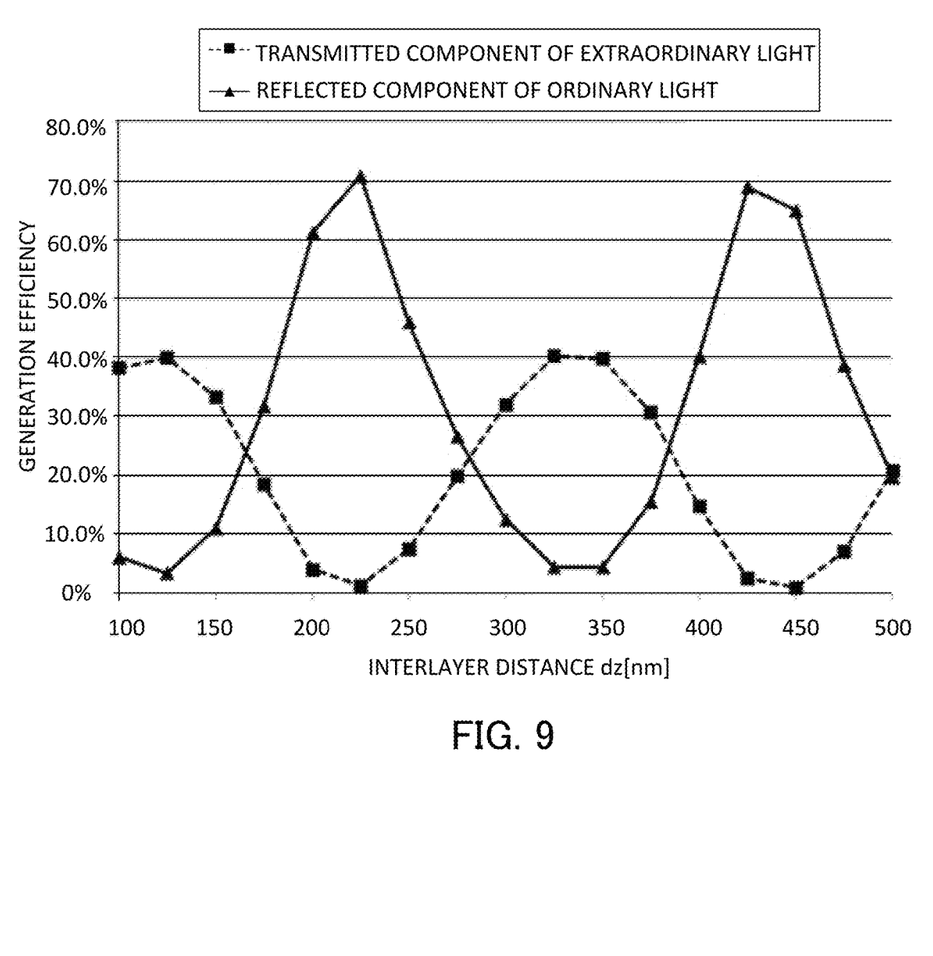
FIG. 9 is a graph showing efficiency against an interlayer distance in an optical element that is Embodiment 3 of the present invention.

FIG. 9 illustrates the generation efficiencies of a reflected component of an ordinary light and a reflected component of an extraordinary light in the above-described structure, when the interlayer distance dz is changed. FIG. 9 illustrates that the generation efficiency of the reflected component of the extraordinary light is high in a range in which the condition of Expression (2) is satisfied.

Satisfying the condition of Expression (2) and also the condition of Expression (8) as described above can achieve an optical element that satisfies the condition for the intensity enhancement in overlapping of the reflected components of the extraordinary lights and thereby has a high generation efficiency of the reflected component of the extraordinary light.

A sizes, that is, a length on the x-y plane and a thickness (t1 or t2 illustrated in FIG. 1) in the z direction of each metal structure included in each metal structure layer is smaller than the incident wavelength. The metal structures include ones each having in the x-y plane, for example, a V shape formed by two straight metal line portions connected with each other at their one ends so as to form an angle $\Delta$ (equal to or larger than 0° and smaller than 180°) therebetween. The angle $\Delta$ equal to 0° means that the metal structure have a shape formed by two metal line portions that are connected straight with each other.

The V-shaped metal structure and the straight metal structure generate, depending on the angle $\Delta$ between the two metal line portions and a length L of each metal line portion, extraordinary lights whose phases are mutually different. This can be utilized to determine positions and shapes of the metal structures for obtaining a target wavefront shape. When each metal structure layer includes metal structures each formed by a set of multiple metal line portions in the V shape or in a cross shape formed by four mutually adjacent metal line portions connected with one another at their one ends so as to form an angle of 90° therebetween, the metal line portions may have different widths.

However, as long as the phase delay amount of the extraordinary light differs depending on the structure of each metal structure layer, the shape of each metal structure therein is not limited to the above-described shapes, but may be solid shapes such as a polygonal columnar shape, a polygonal pyramidal shape and a cylindrical shape. Furthermore, the metal structure may have an obtuse end.

Although it is desirable in terms of manufacturing that the metal structures arranged in the x-y plane in each of the first and second metal structure layers 2 and 4 have a uniform thickness, the metal structure layer may include metal structures having mutually different thicknesses.

The metal structures may be formed of a metal such as Al, Au, Ag, Cu, Cr, Pt or Ni, and may be formed of an alloy of these metals. The metal structures only need to be formed of a material having a finite extinction coefficient, and may be formed of, for example, a semiconductor, a conductive plastic, a light-transmissive conductive material such as ITO or a carbon nanotube.

When the incident wavelength is in a visible wavelength range from 400 nm to 700 nm, the dielectric substrate 1 and the dielectric layer 3 in the optical element 100 of this embodiment may be formed of a typical optical glass that is substantially transparent for the visible wavelength range. However, in order to improve the generation efficiency of the extraordinary light by the metal structures by reducing an influence of interface reflection, a medium surrounding the metal structures desirably has a low refractive index. Thus, the dielectric substrate 1 and the dielectric layer 3 are desirably formed of a material having a refractive index of approximately 1.4 to 1.6 for the visible wavelength range.

A material having a larger extinction coefficient tends to have a higher generation efficiency of the extraordinary light in the visible wavelength range, so that aluminum, gold and silver, aluminum in particular are desirable as the material of the metal structures.

Although the optical element 100 of this embodiment is achieved by the two metal structure layers 2 and 4 and the dielectric layer 3 disposed therebetween, optical elements of other embodiments of the present invention are not limited to ones having two metal structure layers. Specifically, any optical element that includes three or more metal structure layers and whose each interlayer distance between the metal structure layers satisfies the condition of Expression (2) are included in embodiments of the present invention.

Although this embodiment describes the case where the plane wave of the linearly polarized light polarized in a specific direction enters the optical element 100, other cases where the incident light entering the optical element 100 is any other light having various polarization directions, such as an elliptically polarized light and a circularly polarized light, provide the same effect as that in the case where the incident light is the linearly polarized light. For example, when a natural light (non-polarized light) propagating in the z direction enters the optical element 100 of this embodiment as a plane wave, an extraordinary light is generated in each polarization direction, and thus waves formed by overlapping of an ordinary light and the extraordinary light are generated.

Hereinafter, description will be made of specific embodiments (numerical examples).

Example 1

The optical element of Embodiment 1 is manufactured to increase the intensity (generation efficiency) of the transmitted component of the extraordinary light by reducing the intensity (generation efficiency) of the reflected component of the ordinary light for the incident light having the incident wavelength. The incident wavelength is 650 nm.

The optical element of this embodiment basically has the same structure illustrated in FIG. 1. Specifically, the first metal structure layer 2 is formed on the dielectric substrate 1 having a refractive index n of 1.5, the dielectric layer 3 having a refractive index n of 1.5 is disposed on a light emergent side adjacent to the first metal structure layer 2, and the second metal structure layer 4 is further formed on the light emergent side adjacent to the dielectric layer 3. A medium surrounding the metal structures in the second metal structure layer 4 is air.

The first and second metal structure layers 2 and 4 each have the structure (x-y section) illustrated in FIG. 3, and the metal structures of the first and second metal structure layers 2 and 4 are formed of aluminum. The metal structures whose shapes are mutually the same are arranged at normal direction overlap positions in the first and second metal structure layers 2 and 4, and thus the difference $\Phi$ between the phase delay amounts is zero.

The interlayer distance dz between the first and second metal structure layers 2 and 4 is 325 nm, and the thicknesses t (t1 and t2) of the first and second metal structure layers 2 and 4 (that is, the metal structures included in the first and second metal structure layers 2 and 4) are each 20 nm. This configuration has $4n \cdot dz/\lambda = 3$, which satisfies the condition of Expression (2).

Figure 10:
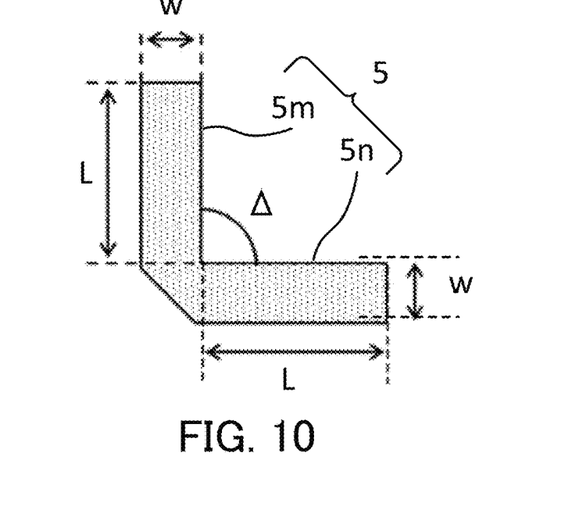
FIG. 10 illustrates shape parameters of a metal structure in each of Embodiments 1 to 3.

The metal structures included in the first and second metal structure layers 2 and 4 each have a V shape or straight shape formed by two metal line portions each having a width w and connected with each other so as to form the angle $\Delta$ therebetween as illustrated in FIG. 3. Table 1 lists shape parameters (the length L, the angle $\Delta$, the width w and the thickness t) and the material (Al) of the metal structures of the first and second metal structure layers 2 and 4. FIG. 10 illustrates definitions of the length L, the angle $\Delta$ and the width w of metal line portions 5m and 5n, which are listed in Table 1. The definitions in FIG. 10 are the same in other embodiments described later.

As listed in Table 1, each of the metal line portions constituting each metal structure has a length shorter than the incident wavelength. Structure 1 in Table 1 corresponds to the metal structures 5a and 5e illustrated in FIG. 3, each of which has a shape corresponding to that obtained by rotating the other by 90° in the x-y plane. Similarly, Structure 2 corresponds to the metal structures 5b and 5f, Structure 3 corresponds to the metal structures 5c and 5g, and Structure 4 corresponds to the metal structures 5d and 5h.

In the first and second metal structure layers 2 and 4 in this embodiment, the shapes and arrangements of the metal structures are determined so that the phase of the extraordinary light is shifted by $\pi/4$ between the metal structures mutually adjacent in the x direction. This configuration causes overlapping of the extraordinary lights whose phases are shifted by $\pi/4$ respectively between the metal structures mutually adjacent in the x direction in each of the first and second metal structure layers 2 and 4, thereby generating a wave propagating in a direction tilted toward the x direction by the angle $d\theta$ relative to the z direction.

Table 4 lists the generation efficiency (simply referred to as "efficiency" in Table 4) of the extraordinary light that is a linearly polarized light polarized in the y direction when a linearly polarized light (hereinafter also referred to as "an x-polarized wave") polarized in the x direction and propagating in the z direction enters the optical element of this embodiment. As listed in Table 4, the optical element of this embodiment generates the extraordinary light by changing a polarization direction of a polarized light component corresponding to 17.9% of the intensity of the incident light and transmits the extraordinary light with changing its propagation direction.

Figure 4:
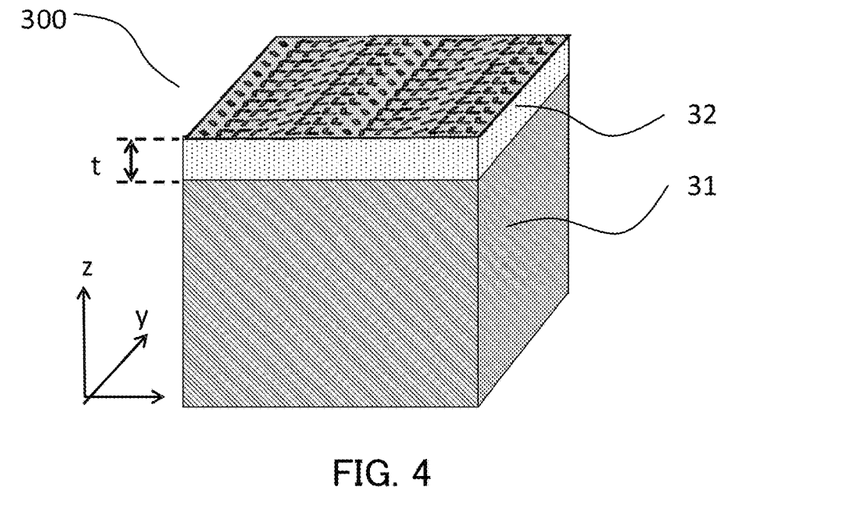
FIG. 4 illustrates a configuration of an optical element that is a comparative example.

Description will be made of an optical element 300 having the structure illustrated in FIG. 4, as a comparative example for comparison with the above-described effect provided by the optical element of this embodiment. The optical element 300 includes a dielectric substrate 31 and a single metal structure layer 32 disposed on a light emergent side adjacent to the dielectric substrate 31. The metal structure layer 32 has the structure (x-y section) illustrated in FIG. 3, and shape parameters of metal structures included in the metal structure layer 32, the incident wavelength, and physical properties of the dielectric substrate 31 are the same as those in Embodiment 1. Table 4 lists the generation efficiency when the x-polarized wave propagating in the z direction enters the optical element 300 in the comparative example. Table 4 indicates that the optical element of Embodiment 1 has an improved generation efficiency of the transmitted component of the extraordinary light as compared to that of the optical element 300 of the comparative example having the single metal structure layer.

Example 2

The optical element of Embodiment 2 is manufactured to increase the intensity (generation efficiency) of the transmitted component of the extraordinary light by reducing the intensity (generation efficiency) of the reflected component of the ordinary light for the incident light having the incident wavelength. The incident wavelength is 650 nm.

The optical element of this embodiment basically has the structure illustrated in FIG. 1. Specifically, the first metal structure layer 2 has the structure (x-y section) illustrated in FIG. 6, and the second metal structure layer 4 has the structure (x-y section) illustrated in FIG. 3. The metal structures of the first and second metal structure layers 2 and 4 are formed of aluminum. The difference $\Phi$ between the phase delay amounts of the extraordinary lights generated in the first and second metal structure layers 2 and 4 is zero.

The interlayer distance dz between the first and second metal structure layers 2 and 4 is 550 nm, and the thicknesses t (t1 and t2) of the first and second metal structure layers 2 and 4 are each 20 nm. This configuration has 4n·dz/λ=5.1, which satisfies the condition of Expression (2).

Figure 6:
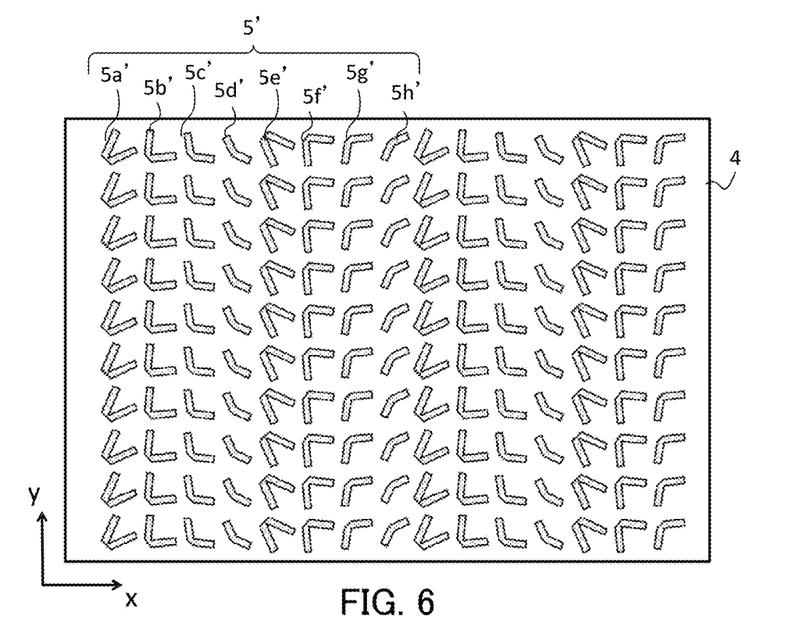
FIG. 6 is an x-y sectional view of the metal structure layer in Embodiment 1.

The metal structures included in the first metal structure layer 2 each have a V shape formed by two metal line portions connected with each other so as to form the angle Δ therebetween as illustrated in FIG. 6. On the other hand, the metal structures included in the second metal structure layer 4 each have a V shape or straight shape formed by two metal line portions connected with each other so as to form the angle Δ therebetween as illustrated in FIG. 3.

Table 2 lists the shape parameters and the material (Al) of the metal structures of the first metal structure layer 2. Table 1 lists the shape parameters and the material (Al) of the metal structures of the second metal structure layer 4. As listed in Tables 1 and 2, each of the metal line portions constituting each metal structure has a length shorter than the incident wavelength. Structure 1 in Table 2 corresponds to the metal structures 5a' and 5e' illustrated in FIG. 6, each of which has a shape corresponding to that obtained by rotating the other by 90° in the x-y plane. Similarly, Structure 2 corresponds to the metal structures 5b' and 5f', Structure 3 corresponds to the metal structures 5c' and 5g', and Structure 4 corresponds to the metal structures 5d' and 5h'.

In the first and second metal structure layers 2 and 4 in this embodiment, similarly to Embodiment 1, the shapes and arrangements of the metal structures are determined so that the phase of the extraordinary light is shifted by π/4 between the metal structures mutually adjacent in the x direction. This configuration generates a wave propagating in a direction tilted toward the x direction by the angle dθ relative to the z direction.

Table 4 lists the generation efficiency of the extraordinary light when the x-polarized wave propagating the z direction enters the optical element of this embodiment. As listed in Table 4, the optical element of this embodiment generates the extraordinary light by changing a polarization direction of a polarized light component corresponding to 20.3% of the intensity of the incident light and transmits the extraordinary light with changing its propagation direction.

Example 3

The optical element of Embodiment 3 is manufactured to increase the intensity (generation efficiency) of the reflected component of the extraordinary light by reducing the intensity (generation efficiency) of the transmitted component of the ordinary light for the incident light having the incident wavelength. The incident wavelength is 650 nm.

The optical element of this embodiment basically has the structure illustrated in FIG. 1. Specifically, the first metal structure layer 2 has the structure (x-y section) illustrated in FIG. 3, and the second metal structure layer 4 has the structure (x-y section) illustrated in FIG. 8. The metal structures of the first and second metal structure layers 2 and 4 are formed of aluminum. The difference Φ between the phase delay amounts of the extraordinary lights generated in the first and second metal structure layers 2 and 4 is π (inverse phase).

The interlayer distance dz between the first and second metal structure layers 2 and 4 is 325 nm, and the thicknesses t (t1 and t2) of the first and second metal structure layers 2 and 4 are each 20 nm. This configuration has 4n·dz/λ=3, which satisfies the condition of Expression (2).

The metal structures included in the first metal structure layer 2 each have a V shape or straight shape formed by two metal line portions connected with each other so as to form the angle Δ therebetween as illustrated in FIG. 3. On the other hand, the metal structures included in the second metal structure layer 4 each have a V shape formed by two metal line portions connected with each other so as to form the angle Δ therebetween as illustrated in FIG. 8. However, each of corresponding metal structures (for example, 5a and 5a") formed at corresponding positions in the layer planes of the first and second metal structure layers 2 and 4 each have a shape corresponding to that obtained by rotating the other by 90° in the x-y plane.

Table 1 lists the shape parameters and the material (Al) of the metal structures of the first and second metal structure layers 2 and 4. Each of the metal line portions constituting each metal structure has a length shorter than the incident wavelength. Structures 1 to 4 in Table 1 correspond to the same metal structures as those in Embodiment 1 in the structure in FIG. 3. On the other hand, in the structure in FIG. 8, Structure 1 corresponds to the metal structures 5a" and 5e" each having a shape corresponding to that obtained by rotating the other by 90° in the x-y plane. Similarly, Structure 2 corresponds to the metal structures 5b" and 5f", Structure 3 corresponds to the metal structures 5c" and 5g", and Structure 4 corresponds to the metal structures 5d" and 5h".

In the first and second metal structure layers 2 and 4 in this embodiment, similarly to Embodiment 1, the shapes and arrangements of the metal structures are determined so that the phase of the extraordinary light is shifted by π/4 between the metal structures mutually adjacent in the x direction. This configuration generates a wave propagating in a direction tilted toward the x direction by the angle dθ relative to the z direction.

Table 4 lists the generation efficiency of the extraordinary light when the x-polarized wave propagating the z direction enters the optical element of this embodiment. As listed in Table 4, the optical element of this embodiment generates the extraordinary light by changing a polarization direction of a polarized light component corresponding to 40.4% of the intensity of the incident light and reflects the extraordinary light with changing its propagation direction.

Example 4

The optical element of Embodiment 4 is manufactured to increase the intensity (generation efficiency) of the reflected component of the extraordinary light by reducing the intensity (generation efficiency) of the reflected component of the ordinary light for the incident light having the incident wavelength. The incident wavelength is 500 nm.

The optical element of this embodiment basically has the structure illustrated in FIG. 1. Specifically, the first metal structure layer 2 has the structure (x-y section) illustrated in FIG. 3. The second metal structure layer 4 has the same structure as that of the first metal structure layer 2 except that dx=350 nm is satisfied in the x direction in FIG. 3. Thus, shifting the second metal structure layer 4 in the x direction relative to the first metal structure layer 2 by dx=350 nm in the layer plane causes metal structures located at identical positions in the x direction in the first and second metal structure layers 2 and 4 to have the same shape. With this configuration, the difference Φ between the phase delay amounts of the extraordinary lights generated in the first and second metal structure layers 2 and 4 is 0.56π.

The interlayer distance dz between the first and second metal structure layers 2 and 4 is 250 nm, and the thicknesses t (t1 and t2) of the first and second metal structure layers 2 and 4 are each 15 nm. This configuration has 4n·dz/λ=3, which satisfies the condition of Expression (2).

Similarly to Embodiment 1, the metal structures included in the first and second metal structure layers 2 and 4 each have a V shape or straight formed by two metal line portions connected with each other so as to form the angle Δ therebetween as illustrated in FIG. 3. However, as described later, the metal structures of the first and second metal structure layers 2 and 4 have shape parameters different from those in Embodiment 1.

Table 3 lists the shape parameters and the material (Al) of the metal structures of the first and second metal structure layers 2 and 4. Each of the metal line portion constituting each metal structure has a length shorter than the incident wavelength.

In the first and second metal structure layers 2 and 4 in this embodiment, similarly to Embodiment 1, the shapes and arrangements of the metal structures are determined so that the phase of the extraordinary light is shifted by π/4 between the metal structures mutually adjacent in the x direction. This configuration generates a wave propagating in a direction tilted toward the x direction by the angle dθ relative to the z direction.

Table 4 lists the generation efficiency of the extraordinary light when the x-polarized wave propagating the z direction enters the optical element of this embodiment. As listed in Table 4, the optical element of this embodiment generates the extraordinary light by changing a polarization direction of a polarized light component corresponding to 22.8% of the intensity of the incident light and reflects the extraordinary light with changing its propagation direction.

Example 5

Figure 11:
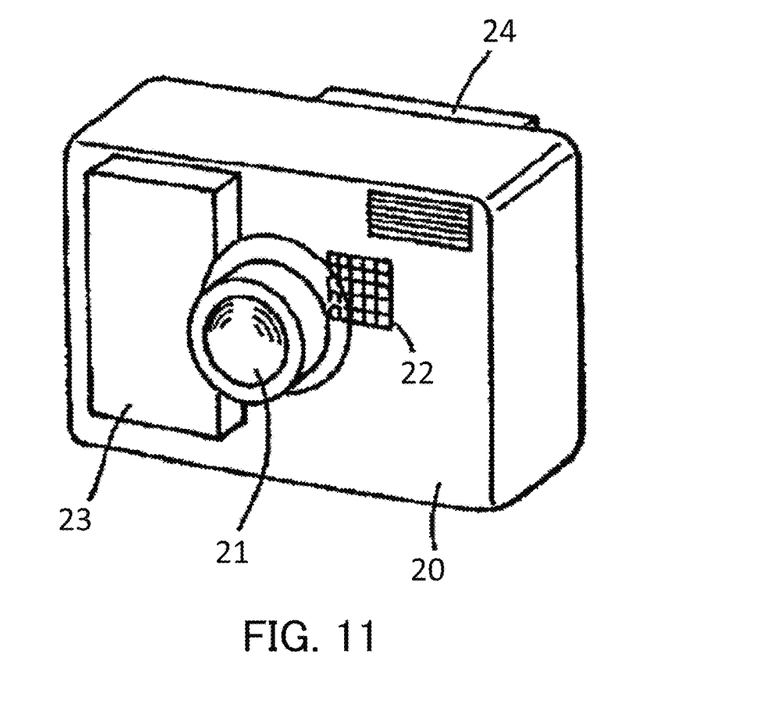
FIG. 11 illustrates an optical apparatus including the optical element of each of the embodiments.

The optical element of each of the above-described embodiments is applicable as a diffraction element, a lens or an optical filter to various optical apparatuses. FIG. 11 illustrates a digital camera as an optical apparatus including the optical element of each of the embodiments as a lens.

Reference numeral 20 denotes a camera body, reference numeral 21 denotes an image capturing optical system including the lens that is the optical element of each of the embodiments. The image capturing optical system includes multiple lenses, and at least one of the lenses is the optical element of each of the embodiments. The image capturing optical system is held by the camera body 20. Reference numeral 22 denotes a solid image sensor (photoelectric conversion element), such as a CCD sensor or a CMOS sensor, built in the camera body 20 and configured to receive an object image formed by the image capturing optical system 21.

Reference numeral 23 denotes a memory that stores image information corresponding to the object image photoelectrically converted by the image sensor 22. Reference numeral 24 denotes an electronic viewfinder for observing image information (in other words, an object), which includes a liquid crystal display panel or the like.

In this manner, the optical element of each of the embodiments included in the image capturing optical system allows the camera to have a good optical performance.

TABLE 1

|  | Structure 1 | | Structure 2 | | Structure 3 | | Structure 4 | | Width | Thickness | |
| --- | --- | --- | --- | --- | --- | --- | --- | --- | --- | --- | --- |
|  | L [nm] | Δ [deg] | L [nm] | Δ [deg] | L [nm] | Δ [deg] | L [nm] | Δ [deg] | w [nm] | t [nm] | Metal |
| Shape parameters and structure material for FIGS. 3 and 8 | 75 (150) | 0 | 135 | 60 | 113 | 90 | 94 | 120 | 35 | 20 | Al |

TABLE 2

|  | Structure 1 | | Structure 2 | | Structure 3 | | Structure 4 | | Width | Thickness | |
| --- | --- | --- | --- | --- | --- | --- | --- | --- | --- | --- | --- |
|  | L [nm] | Δ [deg] | L [nm] | Δ [deg] | L [nm] | Δ [deg] | L [nm] | Δ [deg] | w [nm] | t [nm] | Metal |
| Shape parameters and structure material for FIG. 6 | 72 (144) | 41 | 124 | 76 | 104 | 105 | 85 | 139 | 35 | 20 | Al |

TABLE 3

|  | Structure 1 | | Structure 2 | | Structure 3 | | Structure 4 | | Width | Thickness | |
| --- | --- | --- | --- | --- | --- | --- | --- | --- | --- | --- | --- |
|  | L [nm] | Δ [deg] | L [nm] | Δ [deg] | L [nm] | Δ [deg] | L [nm] | Δ [deg] | w [nm] | t [nm] | Metal |
| Shape parameters and structure material for FIG. 3 | 58 (116) | 0 | 104 | 60 | 87 | 90 | 72 | 120 | 27 | 15 | Al |

TABLE 4

| | Design wavelength λ | Interlayer distance dz | $4\dfrac{n \cdot dz}{\lambda}$ | Phase delay amount difference φ | Ordinary light efficiency [%] | | Extraordinary light efficiency [%] | |
|---|---|---|---|---|---|---|---|---|
| | | | | | Transmission | Reflection | Transmission | Reflection |
| Embodiment 1 | 650 nm | 325 nm | 3 | 0 | 22.4 | 5.8 | 17.9 | 10.6 |
| Embodiment 2 | 650 nm | 550 nm | 5.1 | 0 | 23.6 | 6.8 | 20.3 | 11.2 |
| Embodiment 3 | 650 nm | 325 nm | 3 | π | 2.9 | 4.4 | 0.8 | 40.4 |
| Embodiment 4 | 500 nm | 250 nm | 3 | 0.56 π | 29.7 | 3.3 | 2.3 | 22.8 |
| Comparative Example | 650 nm | | | | 48.5 | 8.7 | 2.5 | 14.2 |

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-211512, filed on Oct. 16, 2014 which is hereby incorporated by reference herein in its entirety.

REFERENCE SIGNS LIST 2 first metal structure layer
3 dielectric layer
4 second metal structure layer
5, 5', 5" metal structure
100 optical element

The invention claimed is:

1. An optical element comprising:
a first metal structure layer and a second metal structure layer each constituted by multiple metal structures whose sizes are smaller than an incident wavelength as a wavelength of an incident light entering the optical element; and
a dielectric layer disposed between the first and second metal structure layers,
wherein, in each of the first and second metal structure layers, the multiple metal structures include metal structures whose shapes are mutually different, and
the following condition is satisfied:

$$\frac{\lambda}{4n}(2N + 0.5) \leq dz \leq \frac{\lambda}{4n}(2N + 1.5)$$

where dz represents a distance between the first and second metal structure layers, λ represents the incident wavelength, n represents a refractive index of the dielectric layer for the incident wavelength, and N represents an integer equal to or larger than zero.

2. An optical element according to claim 1, wherein, at positions located in the first and second metal structure layers and mutually overlap in a normal direction to a layer plane of each of the first and second metal structure layers, a difference φ between phase delay amounts of extraordinary lights respectively generated by the metal structures included in the first and second metal structure layers satisfies the following condition:

$$-\frac{\pi}{2} \leq \Phi \leq \frac{\pi}{2}.$$

3. An optical element according to claim 2, wherein each of the metal structures included in the first and second metal structure layers has a configuration in which two metal line portions each having a length shorter than the incident wavelength are connected with each other at their one ends so as to form an angle therebetween.

4. An optical element according to claim 2, wherein the incident wavelength is in a range from 400 nm to 700 nm.

5. An optical apparatus comprising:
an optical element according to claim 2, and
a body holding the optical element.

6. An optical element according to claim 1, wherein, at positions located in the first and second metal structure layers and mutually overlap in a normal direction to a layer plane of each of the first and second metal structure layers, a difference φ between phase delay amounts of extraordinary lights respectively generated by the metal structures included in the first and second metal structure layers satisfies the following conditions:

$$-\frac{\pi}{2} \leq \Phi - 2\pi\left\{2\frac{n \cdot dz}{\lambda} - N\right\} \leq \frac{\pi}{2}$$

OR $$-\frac{5}{2}\pi \leq \Phi - 2\pi\left\{2\frac{n \cdot dz}{\lambda} - N\right\} \leq -\frac{3}{2}\pi.$$

7. An optical element according to claim 6, wherein each of the metal structures included in the first and second metal structure layers has a configuration in which two metal line portions each having a length shorter than the incident wavelength are connected with each other at their one ends so as to form an angle therebetween.

8. An optical element according to claim 6, wherein the incident wavelength is in a range from 400 nm to 700 nm.

9. An optical apparatus comprising:
an optical element according to claim 6, and
a body holding the optical element.

10. An optical element according to claim 1, wherein each of the metal structures included in the first and second metal structure layers has a configuration in which two metal line portions each having a length shorter than the incident wavelength are connected with each other at their one ends so as to form an angle therebetween.

11. An optical element according to claim 10, wherein the incident wavelength is in a range from 400 nm to 700 nm.

12. An optical apparatus comprising:
an optical element according to claim 10, and
a body holding the optical element.

13. An optical element according to claim 1, wherein the incident wavelength is in a range from 400 nm to 700 nm.

14. An optical apparatus comprising:
an optical element according to claim 13, and
a body holding the optical element.

15. An optical apparatus comprising:
an optical element according to claim 1, and
a body holding the optical element.

* * * * *